United States Patent
Nakaya

(10) Patent No.: US 7,826,007 B2
(45) Date of Patent: Nov. 2, 2010

(54) LIGHTING DEVICE, LIQUID CRYSTAL DISPLAY DEVICE, AND ELECTRONIC APPARATUS

(75) Inventor: Eiji Nakaya, Tatsumo (JP)

(73) Assignee: Seiko Epson Corporation (JP)

( * ) Notice: Subject to any disclaimer, the term of this patent is extended or adjusted under 35 U.S.C. 154(b) by 106 days.

(21) Appl. No.: 12/270,882

(22) Filed: Nov. 14, 2008

(65) Prior Publication Data

US 2009/0153778 A1   Jun. 18, 2009

(30) Foreign Application Priority Data

Dec. 13, 2007   (JP) ............................. 2007-321663

(51) Int. Cl.
  *G02F 1/1335* (2006.01)
  *F21V 8/00* (2006.01)
(52) U.S. Cl. .............................. 349/65; 349/61; 349/56; 362/600; 362/97.1
(58) Field of Classification Search ................. 349/65, 349/67, 62, 61, 56; 362/606, 97.1, 97.2, 362/97.3, 600
See application file for complete search history.

(56) References Cited

U.S. PATENT DOCUMENTS

| 7,303,322 | B2 * | 12/2007 | Lamb et al. ................. 362/600 |
| 7,565,054 | B2 * | 7/2009 | Rinko .......................... 385/146 |
| 2002/0126086 | A1 * | 9/2002 | Takeuchi et al. ............. 345/156 |
| 2005/0135115 | A1 * | 6/2005 | Lamb et al. ................. 362/613 |
| 2005/0259939 | A1 * | 11/2005 | Rinko .......................... 385/146 |
| 2009/0153778 | A1 * | 6/2009 | Nakaya ....................... 349/65 |
| 2009/0322985 | A1 * | 12/2009 | Mizuuchi ..................... 349/62 |

FOREIGN PATENT DOCUMENTS

JP   2007-10704   1/2007   ............... 349/65 X

* cited by examiner

Primary Examiner—Brian M Healy
(74) Attorney, Agent, or Firm—Harness, Dickey & Pierce, P.L.C.

(57) ABSTRACT

A lighting device includes: a plurality of backlights each having a light guide plate disposed in the back of a lighting object to guide light and emit the light to the lighting object and a light source disposed on a side surface of the light guide late to emit the light to the light guide plate; and connection portions connecting the plurality of backlights. Here, the plurality of backlights connected to each other forms a backlight unit to emit light to the lighting object.

11 Claims, 7 Drawing Sheets

LIGHTING DEVICE, LIQUID CRYSTAL DISPLAY DEVICE, AND ELECTRONIC APPARATUS

CROSS-REFERENCE TO RELATED APPLICATION

This application claims, under 35 USC 119, priority of Japanese Application No. 2007-321663 filed Dec. 13, 2007.

BACKGROUND

1. Technical Field

The present invention relates to a lighting device, a liquid crystal display device, and an electronic apparatus.

2. Related Art

In the past, for example, a game machine (for example, slot machine) as an electronic apparatus including a transmissive liquid crystal panel, a frame-like light guide member (a fluorescent tube (usually cold cathode tube) is disposed an outer end surface of the light guide member) disposed in the back of the liquid crystal panel, and a liquid crystal panel (liquid crystal shutter) serving as a shutter switching transmission and non-transmission in the back of the light guide member was known, in which plural (usually three) rotary display members having plural patterns formed on the circumference thereof is disposed in the back of the liquid crystal shutter.

Such a game machine could display an image displayed on the liquid crystal panel and an image of the rotary display member to overlap with each other. Specifically, by allowing the light guide member to guide the light from the fluorescent tube and switching the liquid crystal shutter to the non-transmission, an image was displayed on the transmissive liquid crystal panel. In addition, by allowing the light guide member to guide the light from the fluorescent tube and switching the liquid crystal shutter to the transmission, an image was displayed on the liquid crystal panel and the rotary display members were displayed through the liquid crystal panel and the liquid crystal shutter. The game machine could enhance the presentation effect in display by combining the above-mentioned display operations, thereby enhancing the anticipation for games and the interest in games. A liquid crystal display device having substantially the same configuration as described above i s disclosed in JP-A-2007-10704.

In the above-mentioned configuration, since the light guide member is disposed to correspond to the outer circumference of a display area of the liquid crystal panel, a display area for displaying the rotary display member in the back thereof by transmission is small. On the contrary, when it is intended to display the rotary display member in the entire display area of the liquid crystal panel by transmission, it is necessary to enlarge the outer size of the light guide member, thereby causing the increase in size of the display device. On the one hand, the liquid crystal shutter employs a reflective liquid crystal as the reflective diffusing plate, but the display screen of the liquid crystal panel becomes dark, due to the limitation in structure that the reflectance is limited and it is difficult to reflect the reflected light to the front side in non-transmission. Since the liquid crystal is used as the shutter and thus the rotary display member is viewed through two liquid crystal panels of the liquid crystal panel and the liquid crystal shutter, the transparency of the liquid crystal shutter is low (the low-transmission-rate).

SUMMARY

The invention is to solve at least part of the above problems and may be embodied by the following configurations and applications.

According to a first aspect of the invention, there is provided a lighting device including: a plurality of backlights each having a light guide plate disposed in the back of a lighting object to guide light and emit the light to the lighting object and a light source disposed on a side surface of the light guide plate to emit the light to the light guide plate; and connection portions connecting the plurality of backlights. Here, the plurality of backlights connected to each other forms a backlight unit to emit light to the lighting object.

According to the above-mentioned lighting device, since the backlight is configured by disposing the light source on the side surface of the light guiding member, it is possible to enhance the reflectance of the backlight and to enhance the brightness with which the lighting object is lighted, by satisfactorily guiding the light emitted from the light sources by the light guide plates. As a result, it is possible to improve the visibility of the lighting object. In addition, since the light guide plates are connected by the connection portions to form the backlight unit, flexibility can be given to the backlight unit. Accordingly, it is possible to improve the choices in arrangement of the backlight unit.

The lighting device may further include a driving unit allowing the backlight unit to freely move relative to the lighting object.

According to the lighting device, since the backlight unit is made to freely move relative to the lighting object by the driving unit, it is possible to light the lighting object by the use of the backlights, for example, by allowing the backlight unit to move so as to be located in the back of the lighting object. In addition, by allowing the backlight unit to move so as not to be located in the back of the lighting object, it is possible not to light the lighting object by the use of the backlight unit (a transmission state in the known liquid crystal shutter). The state where the backlight unit is located in the back of the lighting object and the state where the backlight unit is not located in the back of the lighting object can be made to concurrently exist. Accordingly, it is possible to improve the choices in usage of the lighting device. For example, when the lighting object has the transmission property, the backlight unit may have the function of the known liquid crystal shutter, by allowing the backlight unit to freely move in the back of the lighting object.

In the lighting device, the driving unit may include one of a winding portion winding and unwinding the backlight unit and a folding unit folding and unfolding the backlight unit.

According to the lighting device, since the driving unit includes the winding portion to wind or unwind the backlight unit or includes the folding portion to fold or unfold the backlight unit, it is possible to allow the backlight unit to efficiently move.

In the lighting device, the backlight unit may have a curved surface shape.

According to the lighting device, the backlight unit is disposed in a curved surface shape. Accordingly, for example, when the lighting object has a curved surface shape, the backlight unit can be disposed in a shape substantially corresponding to the curved surface shape. As a result, it is possible to light the lighting object to correspond to the shape thereof, thereby homogeneously lighting the lighting object.

In the lighting device, the light sources may be driven independently of each other.

According to the lighting device, since the light sources are independently driven, the backlights may be individually turned on and off, thereby improving the choices in lighting of the backlight unit.

In the lighting device, the light sources may be turned on in a state where the backlight unit is wound or folded.

According to the lighting device, since the light sources are turned on in the state where the backlight unit is wound or folded, it is possible to light a member that is disposed in the back of the backlight unit. For example, when the lighting object has the transmission property, it is possible to easily view the member through the lighting object from the front side of the lighting object, by lighting the member in the back of the backlight unit.

In the lighting device, an LED element may be employed as the light sources.

According to the lighting device, since an LED element is employed as the light sources, it is possible to reduce the size of the backlight unit. In addition, by employing the LED element, it is possible to construct the light sources to emit plural color beams including a red beam, a green beam, a blue beam, and a white beam, thereby allowing the light guide plates to guide the plural color beams. Accordingly, it is possible to improve the choices in light of the backlight unit.

According to another aspect of the invention, there is provided a liquid crystal display device including the above-mentioned lighting device and a transmissive liquid crystal panel disposed as the lighting object in the front of the lighting device.

According to the above-mentioned liquid crystal display device, it is possible to embody a liquid crystal display device having the advantages of the above-mentioned lighting device. By lighting the liquid crystal panel with the lighting device, it is possible to enhance the brightness of the display screen, compared with a case where the known light guide member or liquid crystal shutter is used. Since the lighting device can be made to serve as the shutter of the liquid crystal display device, the transmission state of the known liquid crystal shutter can be accomplished by allowing the backlight unit not to be located in the back of the liquid crystal display device, thereby solving the problem with the low transparency of the known liquid crystal shutter. By independently driving the light sources or employing an LED element as the light source, it is possible to improve the choices in lighting of the backlight of the liquid crystal panel, thereby improving the quality of the display screen of the liquid crystal panel.

In the liquid crystal display device, the number of the backlight units may be at least two and the backlight units may freely move relative to the liquid crystal panel from the outer circumference side.

According to the liquid crystal display device, since at least two backlight units freely move from the outer circumference side of the liquid crystal panel, it is possible to further improve the choices in lighting, thereby further improving the quality of the display screen of the liquid crystal panel.

According to another aspect of the invention, there is provided an electronic apparatus including the above-mentioned liquid crystal display device and an object disposed in the back of the liquid crystal display device. Here, the object is viewed from the front side of the liquid crystal display device through the liquid crystal display device.

According to the electronic apparatus, it is possible to embody an electronic apparatus having the advantages of the above-mentioned liquid crystal display device. Particularly, by improving the brightness of the display screen of the liquid crystal panel disposed in the liquid crystal display device, it is possible to make the display screen bright and visible well. By employing the backlight unit as a shutter, it is possible to view the object through only the liquid crystal panel (by transmission) without using the liquid crystal shutter having the low transmittance, thereby improving the visibility of the object. By turning on the light sources to light the object when the backlight unit is wound or folded, it is possible to further improve the visibility of the object. It is also possible to improve the quality of the display screen of the liquid crystal panel.

For example, by lighting a game machine (for example, a slot machine) as an electronic apparatus by the use of the backlight unit, it is possible to enhance the brightness of the display screen, thereby making the display screen bright and visible well. By employing the backlight unit as a shutter, it is possible to view a rotary display member through only the liquid crystal panel (by transmission), thereby improving the visibility of the rotary display member. By turning on the light sources to light the rotary display member when the backlight unit is wound or folded, it is possible to further improve the visibility of the rotary display member. Since the quality of the display screen of the liquid crystal panel can be improved, it is possible to enhance the presentation effect of the game machine.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings.

First Embodiment

Figure 1:
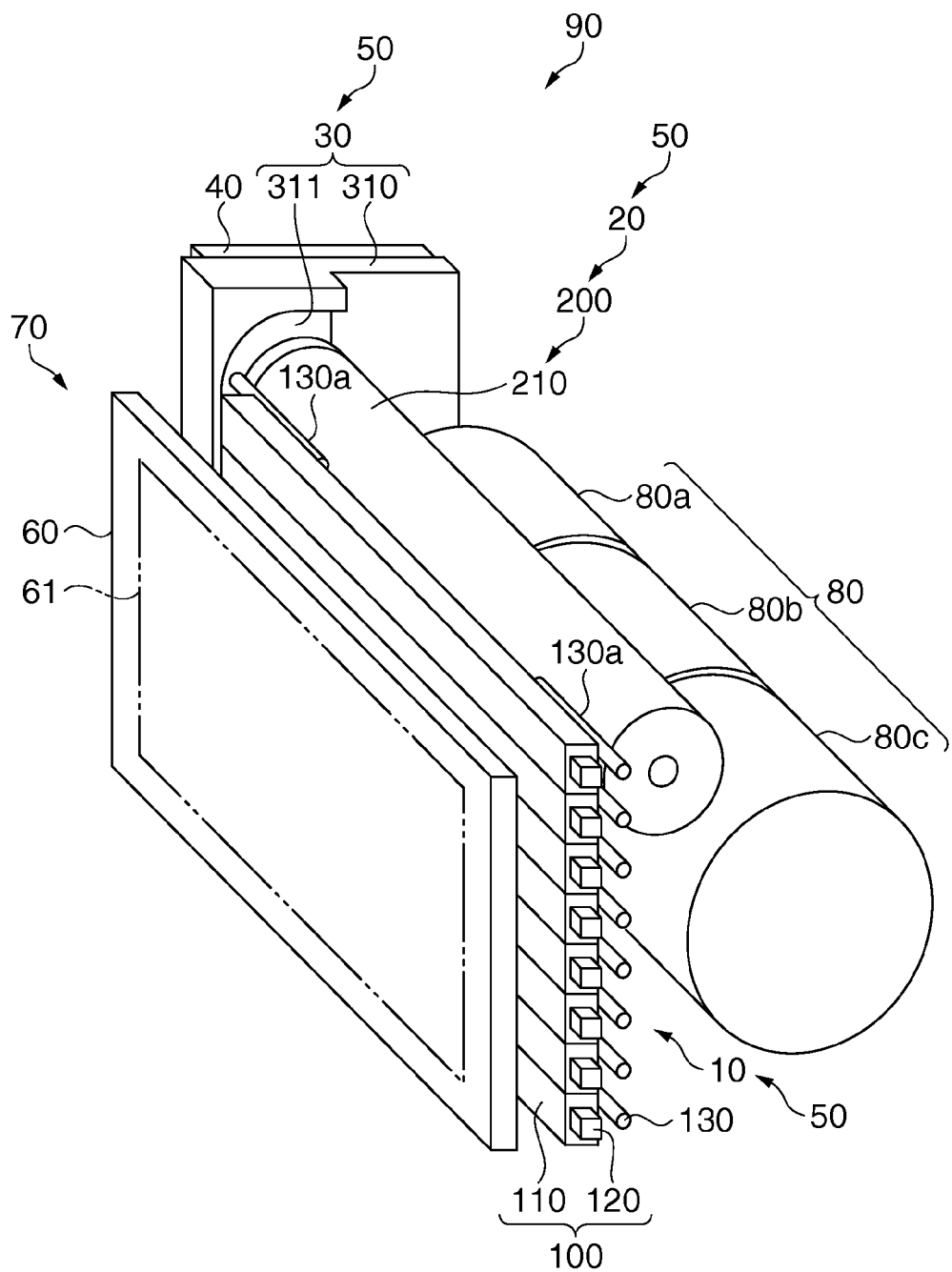
FIG. 1 is a perspective view illustrating a liquid crystal display device according to a first embodiment of the invention.

FIG. 1 is a perspective view illustrating a liquid crystal display device according to a first embodiment of the invention. FIG. 1 shows a liquid crystal display device 70 and a rotary display member 80 as an object when the liquid crystal display device 70 is applied to a game machine 90 which is a kind of electronic apparatus. The configuration and operation of the liquid crystal display device 70 will be described now with reference to FIG. 1.

The liquid crystal display device 70 includes a transmissive liquid crystal panel 60 and a lighting device 50 lighting the liquid crystal panel 60 from the back side. The lighting device 50 includes a backlight unit 10, a driving unit 20, and a holding frame 30.

The backlight unit 10 includes backlights 100, each of which has a light guide plate 110 and a light source 120, and connection portions 130 connecting the backlights 100. The plural backlights 100 are connected to each other by the connection portions 130. The backlight unit 10 is located on the rear surface side (in the back) of the liquid crystal panel 60 and is disposed substantially parallel to the rear surface of the liquid crystal panel 60.

In this embodiment, the driving unit 20 includes a winding portion 200 winding and unwinding the backlight unit 10 to freely move. The winding portion 200 includes a cylindrical roller 210 and a motor (not shown) allowing the roller 210 to rotate. The roller 210 is disposed on the upper-back side of the backlight unit 10 so as to extend to right and left end surfaces of the backlights 100. The center (not shown) of one end surface of the roller 210 is connected to a driving shaft of the motor and rotates with the rotation of the motor. The roller 210 rotatably fixes a connection portion 130*a* of one backlight 100 located at the uppermost end of the backlight unit 10, on its side surfaces. The backlight unit 10 can freely move with the rotation of the roller 210 so as to be wound or unwound on or from the roller 210.

The holding frame 30 is disposed on both end surfaces of the backlight unit 10 and the roller 210. A guide groove 311 guiding the connection portions 130 of the backlight unit 10 to smoothly move is formed in one holding frame 310. A holding section (not shown) fixing the motor and rotatably holding the roller 210 and a receiving section (not shown) receiving a circuit board unit 40 to be described later are formed in the holding frame 310. The same guide groove (not shown) and a holding section (not shown) rotatably holding the roller 210 are formed in the other holding frame (not shown). The roller 210 and the backlight unit 10 are guided to operate by both holding frames 30.

An electrical element (not shown) driving the liquid crystal panel 60 or the motor is mounted and wired on the circuit board unit 40 received in one holding frame 310. The liquid crystal panel 60 is connected to the circuit board unit 40 through a flexible board (not shown).

The liquid crystal display device 70 is received in a metal fixing frame (not shown) receiving the liquid crystal panel 60 and the lighting device 50 to form a unit. The liquid crystal display device 70 is inserted into a synthetic resin outer frame (not shown) and is fixed to the front of a rotary display member 80 which is an object of the game machine 90 to be described later.

Accordingly, the rotary display member 80 is located on the rear surface side (in the back) of the backlight unit 10. The rotary display member 80 is substantially the same as used in the known game machine and plural rotary display members are arranged in a cylindrical shape. In this embodiment, the rotary display member 80 includes three rotary display members 80 (80*a*, 80*b*, and 80*c*). Plural patterns are formed on the side surfaces of the rotary display members 80. The rotary display members 80 rotate independently of each other.

In the game machine 90 having the above-mentioned configuration, a user (game player) views the inside of an image viewing area 61 (display area) of the liquid crystal panel 60 in the game machine 90.

Figure 2A:
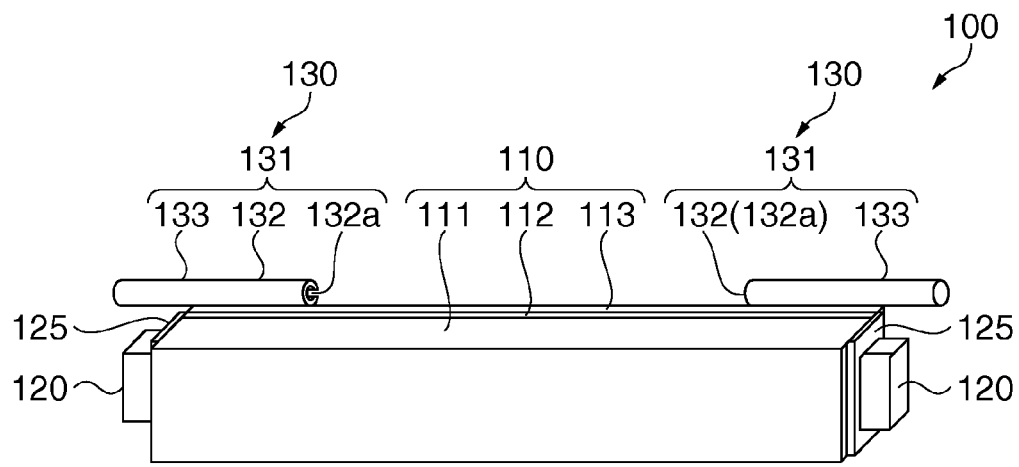
FIGS. 2A and 2B are perspective views illustrating one backlight of the backlight unit.
Figure 2B:
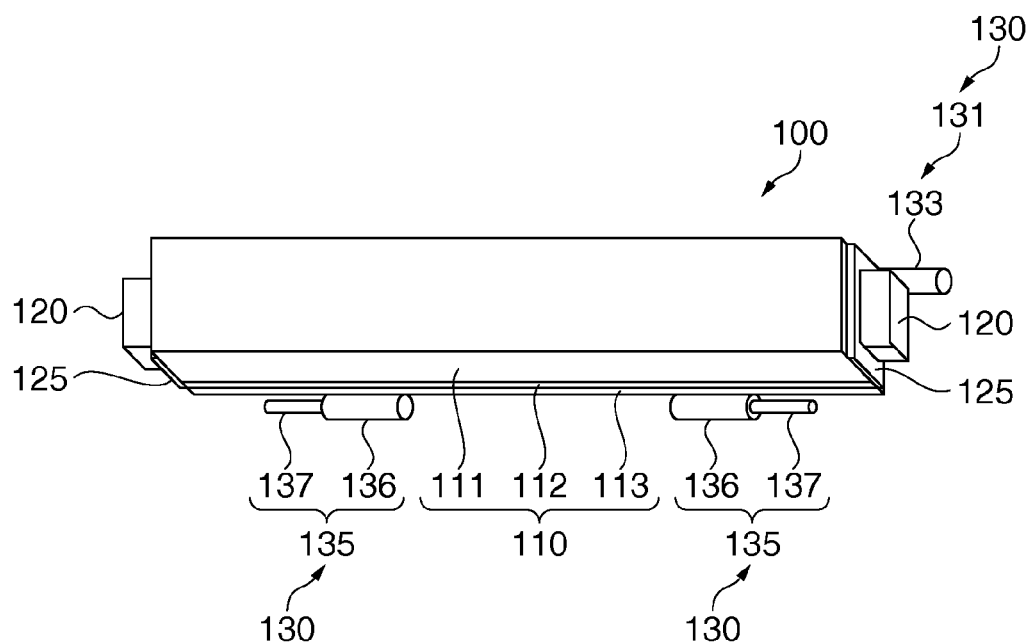

FIGS. 2A and 2B are perspective views illustrating one backlight of the backlight unit, where FIG. 2A is a perspective view of the backlight as viewed from the upside and FIG. 2B is a perspective view of the backlight as viewed from the downside. The configuration and operation of the backlight 100 will be described now with reference to FIGS. 2A and 2B.

The backlight 100 includes a light guide plate 110 and a light source 120. The light guide plate 110 has a longitudinal rectangular shape and includes a light guide plate body 111 made of acryl resin, a prism sheet 112 disposed on the rear surface of the light guide plate body 111, and a reflecting plate 113 disposed on the rear surface of the prism sheet 112. The light guide plate body 111 may be made of transparent synthetic resin or transparent inorganic material, in addition to the acryl resin.

A circuit board 125 on which the light source 120 is mounted and wired is fixed to the right and left side surfaces (end surfaces) of the light guide plate 110. In this embodiment, a light emitting diode (LED element) is employed as the light source 120, which emits light with the application of forward current to emit a white beam. The light source 120 emits light to the inside from the end surface of the light guide plate 110 through an opening (not shown) formed in the circuit board 125. In addition to the LED element, a small-sized lamp having a filament may be used as the light source 120.

The light guide plate 110 reflects the light from the light source 120, which is incident on the inside from the side surface (end surface) of the light guide plate 110, to the front side by the use of the reflecting plate 113 and refracts the light in the same direction (direction substantially perpendicular to the front surface of the light guide plate body 111) by the use of the prism sheet 112. The light is guided in the inside of the light guide plate body 111 and is emitted in the perpendicular direction from the front surface of the light guide plate body 111. Accordingly, the light guide plate 110 efficiently emits the light from the light source 120 in the direction substantially perpendicular to the front surface of the light guide plate body 111. Since a diffusing agent is added to the inside of the light guide plate body 111, the guided light is diffused by the diffusing agent to have homogeneous brightness and is then emitted from the light guide plate 110.

In the light guide plate 110, connection portions 130 connecting the backlights 100 to each other are formed at the upper and lower corners of the rear surface of the reflecting plate 113. Each connection portion 130 includes a pair of cylindrical connection receivers 131 formed at the upper corner of the light guide plate 110 and a pair of connection protrusions 135 formed at the lower corner of the light guide plate 110. The connection receiver 131 includes a guide portion 133 protruding from the end surface of the light guide plate 110 and a cylindrical insertion receiver 132 having a hole portion 132*a* for receiving a protrusion 137 of the connection protrusion 135. The connection protrusion 135 includes a bar-like protrusion 137 being inserted into the insertion receiver 132 of the connection receiver 131 and a cylindrical protrusion fixing portion 136 fixing the protrusion 137 to the light guide plate 110.

When the backlights 100 having the above-mentioned configuration are connected by the connection portions 130, the upper connection receiver 131 of one backlight 100 is connected to the connection protrusion 135 of another backlight 100 located above the backlight 100. The lower connection protrusion 135 of the backlight 100 is connected to the connection receiver 131 of another backlight 100 located below the backlight 100. The connection is carried out by inserting the protrusion 137 of the connection protrusion 135 into the hole portion 132a formed in the insertion receiver 132 of the connection receiver 131. By this connection, the protrusion 137 is rotatably held and fixed to the insertion receiver 132. By repeatedly performing the connection operation to correspond to the number of the backlights 100, the backlight unit 10 is completed.

The guide portions 133 of the connection receivers 131 protruding from both end surfaces of the backlights 100 are guided by the guide grooves 311 formed in the holding frames 30, as shown in FIG. 1. The guide portions 133 of the backlights 100 are guided by the guide grooves 311 in movement and are regulated in the vertical and horizontal directions, whereby the backlight unit 10 is made to stably move.

The circuit boards 125 on which the light sources 120 are mounted are connected to the circuit board unit 40 through a flexible board (not shown). The flexible board is disposed on the rear surface side of the light guide plate 110 and between the pairs of connection portions 130 and can move with the movement of the backlight unit 10.

Figure 3A:
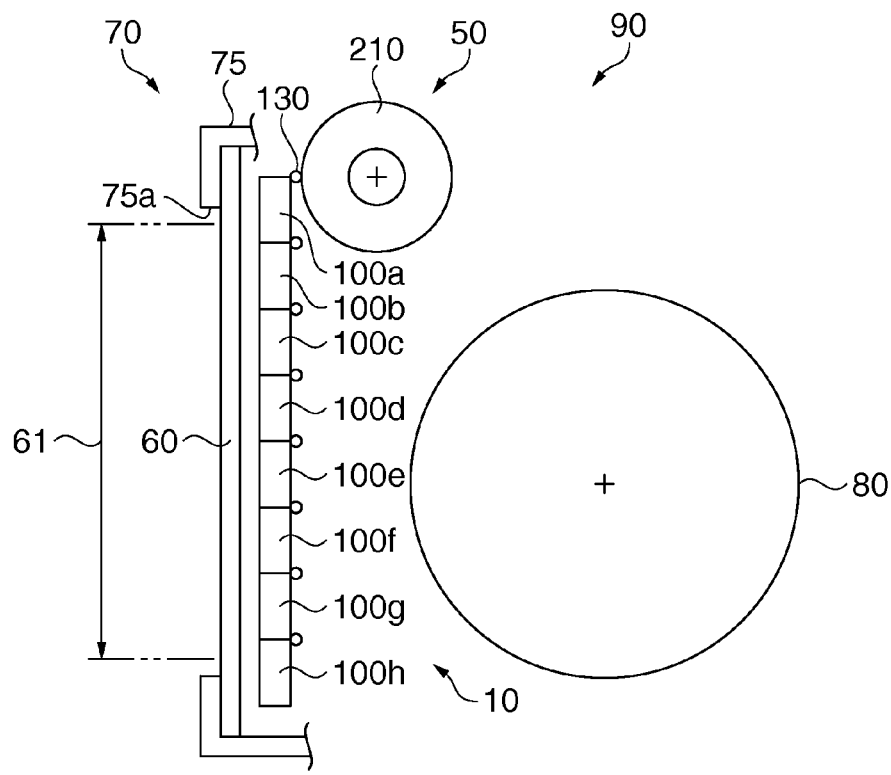
FIGS. 3A and 3B are sectional views schematically illustrating the liquid crystal display device.
Figure 3B:
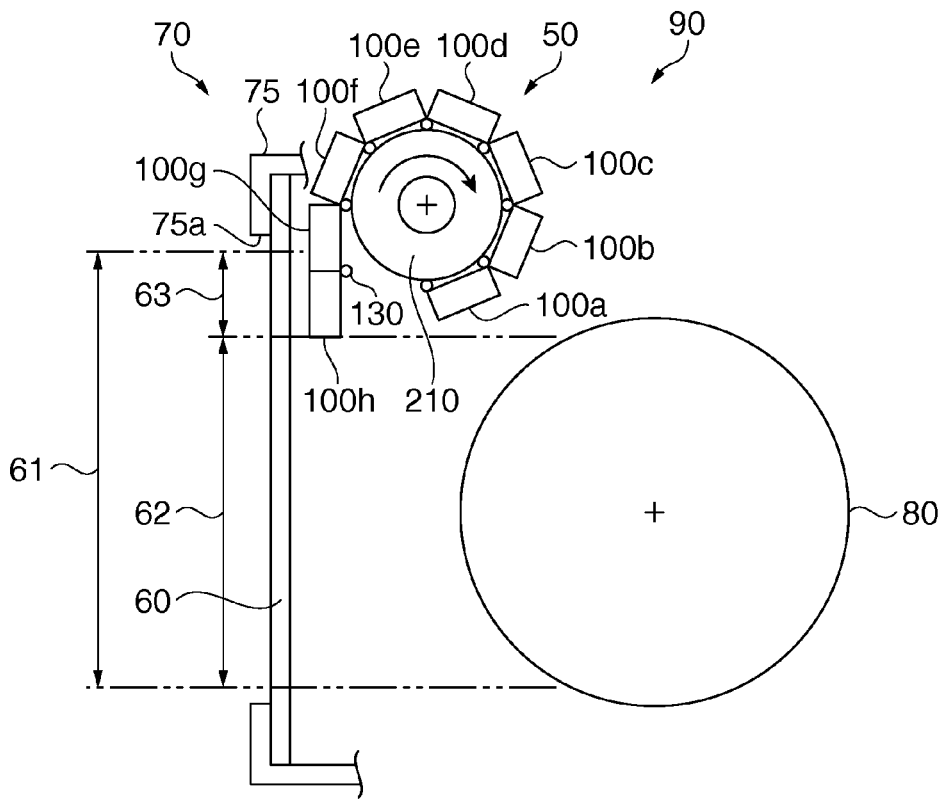

FIGS. 3A and 3B are sectional views schematically illustrating the liquid crystal display device, where FIG. 3A is a diagram in which the backlight unit is unwound to cover the entire rotary display members and FIG. 3B is a diagram in which the backlight unit is wound to open the rotary display members. The operation of the backlight unit 10 and the operation of the liquid crystal display device 70 accompanied with the operation will be described now with reference to FIGS. 3A and 3B.

FIG. 3A is also a section of the perspective view shown in FIG. 1. As shown in FIG. 3A, in the liquid crystal display device 70, the lighting device 50 is disposed in the back of the liquid crystal panel 60 and the rotary display members 80 are disposed in the back thereof. The liquid crystal display device 70 is received in the fixing frame 75. The liquid crystal panel 60 displays a display image through an opening 75a formed in the fixing frame 75. The liquid crystal panel 60 forms the display image in the image viewing area 61.

As described above, in the backlight unit 10, the backlight 100a located at the uppermost is rotatably supported and fixed by the roller 210. In this embodiment, the backlight unit 10 includes eight backlights 100 (referred to as backlights 100a to 100h sequentially from the uppermost) which are connected to each other by the connection portions 130. The backlight unit 10 is guided by the guide grooves 311 (see FIG. 1) of the holding frames 30 (see FIG. 1) and is disposed substantially parallel to the rear surface side of the liquid crystal panel 60.

FIG. 3A shows a state where the wound backlight unit 10 is unwound and stopped at the maximum rotational position with the counterclockwise rotation of the roller 210. With this operation, the backlight unit 10 is located to cover the entire rear surface of the liquid crystal panel 60. In this state, the backlight unit 10 emits light to the liquid crystal panel 60 to forwardly reflect the image formed on the transmissive liquid crystal panel 60. Accordingly, the game player can view the image from the front side of the liquid crystal panel 60. The viewed image is brighter with higher brightness than the image reflected by the known liquid crystal shutter. In this state, the rotary display members 80 disposed in the back of the lighting device 50 is shielded by the backlight unit 10. Accordingly, the game player cannot view the rotary display members 80 from the front side of the liquid crystal panel 60.

FIG. 3B shows a state where the unwound backlight unit 10 is wound and stopped at a predetermined rotational position by allowing the roller 210 to rotate clockwise. With the rotation of the roller 210, the backlight unit is wound on the side surface of the roller 210 sequentially from the backlight 100a located at the uppermost of the backlight unit 10. In this embodiment, the backlights 100g and 100h are not wound, but are guided by the guide grooves 311 and located on the rear surface side of the liquid crystal panel 60.

With this operation, the liquid crystal display device 70 has a state where an area in which the backlights 100 are not located on the rear surface side of the liquid crystal panel 60 and an area in which the backlights are located on the rear surface side thereof both exist in the image viewing area 61 of the liquid crystal panel 60. The area in which the backlights 100 are not located is referred to as a transmissive area 62 and the area in which the backlights are located is referred to as a reflective area 63.

In the state shown in FIG. 3B, by allowing the backlight unit 10 (backlights 100a to 100h) to emit light, the light emitted from the backlights 100a to 100c lights the rotary display members 80. The light emitted from the backlights 100g and 100h lights the liquid crystal panel 60 from the rear surface side thereof. Accordingly, the game player can view the bright rotary display members 80 lighted by the backlights 100 through the transmissive area 62 of the liquid crystal panel 60 (by transmission) from the front side of the liquid crystal panel 60. In addition, the game player can view a bright image with high brightness formed on the liquid crystal panel 60 through the reflective area 63 of the liquid crystal panel 60 from the front side of the liquid crystal panel 60.

Figure 4:
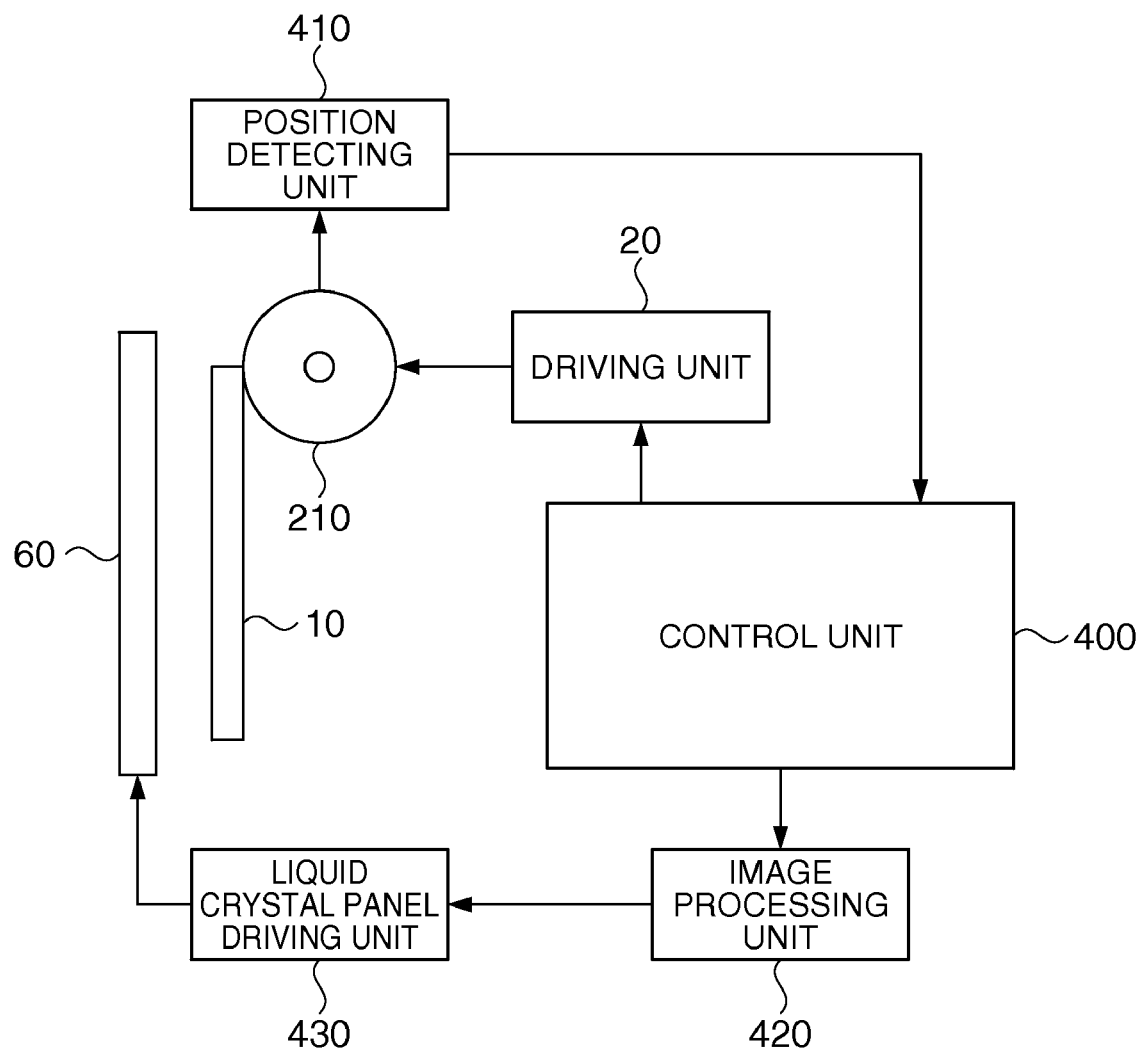
FIG. 4 is a block diagram schematically illustrating a circuit for driving the liquid crystal display device.

FIG. 4 is a block diagram schematically illustrating a circuit configuration for driving the liquid crystal display device. The circuit configuration and operation of the liquid crystal display device 70 will be described now with reference to FIG. 4.

The liquid crystal display device 70 includes a position detecting unit 410 detecting a rotational position of the roller 210, a driving unit 20 rotationally driving the roller 210, a liquid crystal panel driving unit 430 driving the liquid crystal panel 60, an image processing unit 420 preparing and sending proper image signals suitable to the liquid crystal panel driving unit 430, and a control unit 400 comprehensively controlling the operating times of the units and the driving unit 20 and the image processing unit 420 on the basis of control signals from the game machine 90. The electrical elements of the units are mounted and wired in the circuit board unit 40.

The position detecting unit 410 detects the position of the backlight unit 10 by the use of the rotational position of the roller 210 and outputs a signal to the control unit 400. Specifically, the position detecting unit 410 includes a reflecting member (not shown) being disposed on one end surface of the roller 210 and having reflecting surfaces formed every constant angle and an optical sensor (not shown) being mounted on the circuit board unit 40 to transmit the light to the reflecting member and to receive the reflected light. The position detecting unit 410 outputs the detected signal to the control unit 400.

The image processing unit 420 forms an image to be displayed on the liquid crystal panel 60. The image processing unit 420 reads and processes image data stored in a memory of the image processing unit 420 in accordance with a signal from the control unit 400, forms an image corresponding to the signal from the control unit 400, and outputs the formed image as a display image signal to the liquid crystal panel driving unit 430. The liquid crystal panel driving unit 430 outputs the display image signal input from the image processing unit 420 to the liquid crystal panel 60 to drive the liquid crystal panel 60.

Here, the image processing unit 420 can form a variety of display image signals in accordance with the signal from the control unit 400 having received the control signal from the game machine 90. For example, as shown in FIG. 3A, the position detecting unit 410 detects the position of the roller 210 when the backlight unit 10 is located to cover the entire rear surface of the liquid crystal panel 60 (to shield the rotary display members 80) by the driving unit 20. The detected signal is input to the control unit 400. The control unit 400 outputs to the image processing unit 420 a signal for forming a predetermined image (image reflected and displayed by the liquid crystal panel 60) when the rotary display members 80 are not viewed. In accordance with the signal, the image processing unit 420 reads and processes the corresponding image data from the memory and outputs the display image signal to the liquid crystal panel driving unit 430. Accordingly, the liquid crystal panel 60 displays a predetermined image when the rotary display members 80 are not viewed.

As shown in FIG. 3B, the position detecting unit 410 detects the position of the roller 210 when the backlight unit 10 is located to form the transmissive area 62 and the reflective area 63 in the liquid crystal panel 60 by the driving unit 20. The detected signal is input to the control unit 400. The control unit 400 outputs to the image processing unit 420 a signal for forming a predetermined image corresponding to the state where the transmissive area 62 and the reflective area 63 are formed. In accordance with the signal, the image processing unit 420 reads and processes the corresponding image data from the memory and outputs the display image signal to the liquid crystal panel driving unit 430.

Accordingly, the liquid crystal panel 60 displays the predetermined images corresponding to the transmissive area 62 and the reflective area 63. In this embodiment, the transmissive area 62 does not display an image and the transmissive area 62 transmits the image of the rotary display members 80. As this time, the rotary display members 80 start their rotation. The predetermined image accompanied with the rotation of the rotary display members 80 is displayed in the reflective area 63.

In this embodiment, the control unit 400 controls the images when the backlight unit 10 is moving from the state where it completely shields the rotary display members 80 (the state shown in FIG. 3A) to the state where it is wound (the state shown in FIG. 3B). In this state, with the winding of the backlight unit 10, the transmissive area 62 is enlarged and the reflective area 63 is reduced. The variation is detected by the position detecting unit 410 and the image corresponding to the reflective area 63 at that position is formed and frequently displayed in the reflective area 63. On the contrary, when the backlight unit 10 is moving from the state where it is wound (the state shown in FIG. 3B) to the state where it completely shields the rotary display members 80 (the state shown in FIG. 3A), the control unit controls 400 the images.

By performing such an operation (display operation), it is possible to enhance the presentation effect in display of the game machine 90 and to enhance the anticipation for the game, thereby improving the interest in the game.

The following advantages can be obtained according to the above-mentioned embodiment.

(1) In the liquid crystal display device 70 or the lighting device 50 according to this embodiment, the light sources 120 are disposed on the side surfaces (end surfaces) of the light guide plate 110 to form the backlights 100. Accordingly, by satisfactorily guiding the light from the light sources 120 to the light guide plates 110, it is possible to enhance the reflectance of the backlights, compared with the known liquid crystal shutter, thereby enhancing the brightness for lighting (reflecting) the liquid crystal panel 60 which is the lighting object. Therefore, it is possible to improve the visibility of an image displayed on the liquid crystal panel 60. Since the light guide plates 110 are connected to each other by the connection portions 130 to form the backlight unit 10, it is possible to give the flexibility to the backlight unit 10.

(2) In the liquid crystal display device 70 or the lighting device 50 according to this embodiment, the driving unit 20 allows the backlight unit 10 to freely move relative to the liquid crystal panel 60. Accordingly, by allowing the backlight unit 10 to move so as to be located in the back of the liquid crystal panel 60, it is possible to light (reflect) the liquid crystal panel 60 with the light emitted from the light guide plates 110. By allowing the backlight unit 10 to move so as not to be located in the back of the liquid crystal panel 60, the liquid crystal panel 60 can be made not to reflect the light but to transmit the light. The state where the backlight unit 10 is located in the back of the liquid crystal panel 60 (the state corresponding to the reflective area 63) and the state where the backlight unit is not located in the back of the liquid crystal panel 60 (the state corresponding to the transmissive area 62) can exist concurrently. Accordingly, it is possible to increase the choices in usage of the lighting device 50. Since the liquid crystal panel 60 has the light transmitting property, the function of the known liquid crystal shutter can be given to the backlight unit 10 and the problem with the transmission property of the known liquid crystal panel can be solved, by allowing the backlight unit 10 to freely move in the back of the liquid crystal panel 60. In addition, it is possible to clearly view the rotary display members 80 through the liquid crystal panel 60.

(3) In the liquid crystal display device 70 or the lighting device 50 according to this embodiment, the driving unit 20 includes the roller 210 as the winding portion to wind and unwind the backlight unit 10, thereby efficiently enabling the movement of the backlight unit 10.

(4) In the liquid crystal display device 70 or the lighting device 50 according to this embodiment, it is possible to light the rotary display members 80 disposed in the back of the backlight unit 10 by turning on the light sources 120 in the state where the backlight unit 10 is wound. Accordingly, even when the liquid crystal panel 60 is made to transmit the light, it is possible to easily view the rotary display members 80 through the liquid crystal panel 60 from the front side of the liquid crystal panel 60.

(5) In the liquid crystal display device 70 or the lighting device 50 according to this embodiment, it is possible to reduce the size of the backlight unit 10 by employing the LED elements as the light sources 120.

(6) In the game machine 90 which is a kind of electronic apparatus employing the liquid crystal display device 70 or the lighting device 50 according to this embodiment, it is possible to enhance the brightness of the display screen of the liquid crystal panel 60 by the lighting using the backlight unit 10, thereby making the display screen bright and visible well. By using the backlight unit 10 as a shutter, it is possible to view the rotary display members 80 through only the liquid crystal panel 60 without using the known liquid crystal shutter having the low transmittance, thereby improving the visibility of the rotary display members 80. By turning on the light sources 120 to light the rotary display members 80 when the backlight unit 10 is wound, it is possible to further improve the visibility of the rotary display members 80. Since the choices in display of the display screen of the liquid crystal panel 60 can be improved, it is possible to improve the presentation effect in display of the game machine 90.

(7) When the liquid crystal display device 70 or the lighting device 50 according to this embodiment is provided to the game machine 90, it is disposed in front of the rotary display members 80. In the past, the frame-like light guide member was disposed on the outer circumference of the image forming area of the liquid crystal panel, in the back of the liquid crystal panel. However, in this embodiment, the known light guide member is not employed. Accordingly, when the space for disposing the liquid crystal display device 70 in the game machine 90 is the same as the known, it is possible to enlarge the image forming area 61 of the liquid crystal panel 60. Accordingly, it is possible to enlarge the display area of the liquid crystal panel 60. When the display area is the same as the known, it is possible to reduce the size of the liquid crystal display device 70 compared to the known.

Second Embodiment

Figure 5:
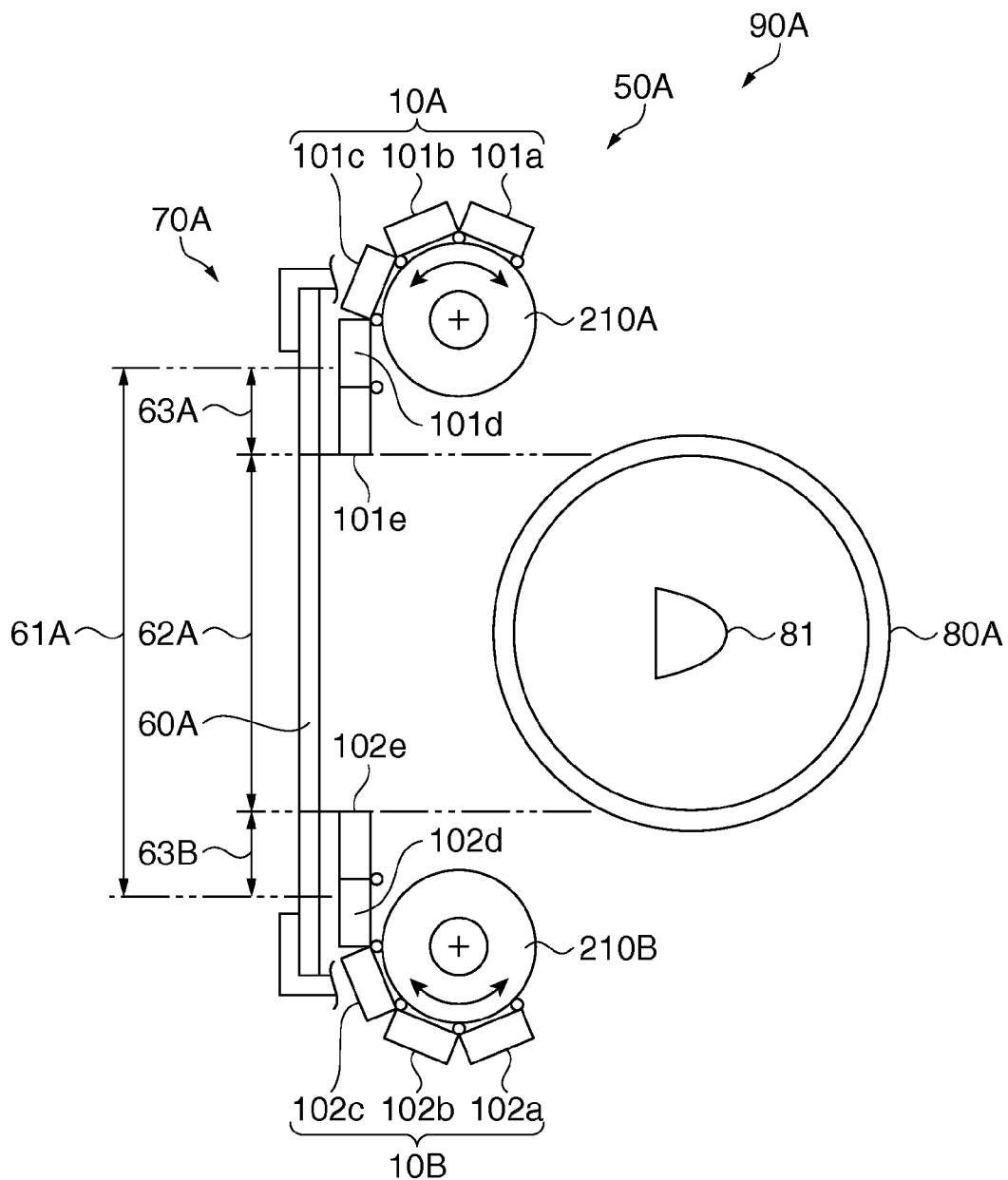
FIG. 5 is a sectional view schematically illustrating a liquid crystal display device according to a second embodiment of the invention.

FIG. 5 is a sectional view schematically illustrating a liquid crystal display device according to a second embodiment of the invention. The configurations of a liquid crystal display device 70A and a lighting device 50A will be described now with reference to FIG. 5.

The lighting device 50A according to this embodiment is different from the lighting device 50 according to the first embodiment, in that two backlight units 10A and 10B are used. One backlight unit 10A is constructed by connecting five backlights 101 (referred to as backlights 101a to 101e sequentially from the uppermost) to each other. Similarly, the other backlight unit 10B is constructed by connecting five backlights 102 (referred to as backlights 102a to 102e sequentially from the lowermost) to each other. The other configurations of the backlights 101 and 102 are similar to those of the backlights 100 of the first embodiment. The backlight units 10A and 10B are guided to a guide groove (not shown) of a holding frame (not shown), similarly to the first embodiment, and is disposed substantially parallel to the rear surface of the liquid crystal panel 60A.

The backlight units 10A and 10B are disposed to freely move from the upside and the downside of the outer circumference of a liquid crystal panel 60A, respectively. Specifically, the backlight unit 10A is disposed on the upside of the liquid crystal panel 60A and the backlights 101a are connected to the roller 210A, similarly to the first embodiment. The backlight unit 10A can be wound with the clockwise rotation of the roller 210A and can be unwound with the counterclockwise rotation thereof. The backlight unit 10B is disposed on the downside of the liquid crystal panel 60A and the backlights 102a are connected to the roller 210B, similarly to the backlight unit 10A. The backlight unit 10B can be wound with the counterclockwise rotation of the roller 210B and can be unwound with the clockwise rotation thereof. The backlight unit 10A is wound on the roller 210A to move up. The backlight unit 10B is wound on the roller 210B to move down, to the contrary. When the backlight units are unwound, they move in the opposite directions of the winding directions.

The backlight unit 10A is located in the back (rear surface side) of the liquid crystal panel 60A and occupies the upper half area of the liquid crystal panel 60A when it is unwound. The backlight unit 10B is also located in the back (rear surface side) of the liquid crystal panel 60A and occupies the lower half area of the liquid crystal panel 60A when it is unwound. Accordingly, when both the backlight units 10A and 10B are unwound, they occupy the entire area of the rear surface side of the liquid crystal panel 60A.

In FIG. 5, the positional relationship is shown when both the backlight units 10A and 10B are wound. In this embodiment, when the backlight unit 10A is wound with the rotation of the roller 210A, the backlights 101d and 101e are not wound, but are guided by the guide grooves and located on the rear surface side of the liquid crystal panel 60A. When the backlight unit 10B is wound with the rotation of the roller 210B, the backlights 102d and 102e are not wound, but are guided by the guide grooves and located on the rear surface side of the liquid crystal panel 60A.

When both the backlight units 10A and 10B are wound, the liquid crystal display device 70A has a state where an area in which the backlights 101 and 102 are not located in the back surface side of the liquid crystal panel 60A and an area in which the backlights are located exist in an image viewing area 61A of the liquid crystal panel 60A. The area in which the backlights 101 and 102 are not located is referred to as a transmissive area 62A, the area in which the backlights 101 are located is referred to as a first reflective area 63A, and the area in which the backlights 102 are located is referred to as a second reflective area 63B.

In this embodiment, two backlights 101d and 101e of the backlight unit 10A in this state emit light (the light sources (not shown) of the backlights 101d and 101e are turned on). The other backlights 101a to 101c do not emit light (the light sources (not shown) of the backlights 101a to 101c are turned off). Similarly, two backlights 102d and 102e of the backlight unit 10B in this state emit light (the light sources (not shown) of the backlights 102d and 102e are turned on). The other backlights 102a to 102c do not emit light (the light sources (not shown) of the backlights 102a to 102c are turned off).

In this embodiment, the light sources of the backlights 101 and 102 of the backlight units 10A and 10B can independently be driven (turned on and off) and the same control unit (not shown) as the control unit 400 shown in FIG. 4 is used for control. At this time, depending on the positions of the backlights 101 and 102 detected by a position detecting unit (not shown), the control unit controls the light sources of the backlights 101 and 102 located in the back surface of the image viewing area 61A of the liquid crystal panel 60A to be turned on and controls the light sources of the backlights 101 and 102 not located in the back surface of the image viewing area to be turned off.

A lighting lamp 81 is provided in the inside of a rotary display member 80A disposed in the back of the lighting device 50A. By turning on the lighting lamp 81, the rotary display member 80A is lighted from the inside, thereby visualizing the rotary display member 80A itself and the patterns and the like formed on the side surface of the rotary display member 80A.

Accordingly, as shown in FIG. 5, the first reflective area 63A of the liquid crystal panel 60A is lit from the rear side with the light emitted from the backlight units 10A (backlights 101d and 101e). Therefore, a game player can view an image formed on the liquid crystal panel 60A as a bright image with high brightness from the front side of the liquid crystal panel 60A, in the first reflective area 63A of the liquid crystal panel 60A. In addition, the second reflective area 63B of the liquid crystal panel 60A is lit from the rear side with the light emitted from the backlight units 10B (backlights 102d and 102e). Therefore, the game player can view an image formed on the liquid crystal panel 60A as a bright image with high brightness from the front side of the liquid crystal panel 60A, in the second reflective area 63B of the liquid crystal panel 60A. By allowing the lighting lamp 81 to light the rotary display member 80A from the inside, the game player can view the bright rotary display member 80A through the transmissive area 62A of the liquid crystal panel 60A (by transmission) from the front side of the liquid crystal panel 60A.

When both the backlight units 10A and 10B are unwound, the backlight units 10A and 10B are located in the upper and lower half areas of the image viewing area 61A on the rear surface of the liquid crystal panel 60A, respectively. Accordingly, the backlight units 10A and 10B cover the entire area of the rear surface side of the liquid crystal panel 60A. In this state, the backlights 101 and 102 are all turned on. Accordingly, the image formed on the transmissive liquid crystal panel 60A is reflected forward. Therefore, the game player can view the image formed on the liquid crystal panel 60A as a bright image with high brightness from the front side of the liquid crystal panel 60A, in the entire area of the image viewing area 61A of the liquid crystal panel 60A. In this state, the rotary display member 80A is shielded by the backlight units 10A and 10B. Accordingly, the game player cannot view the rotary display member 80A from the front side of the liquid crystal panel 60A.

In this embodiment, similarly to the first embodiment, the control unit controls the images when the backlight units 10A and 10B are moving from the state where it completely covers the rotary display member 80A to the state where they are wound (the state shown in FIG. 5). In this state, with the winding of the backlight units 10A and 10B, the transmissive area 62A is enlarged and the first reflective area 63A and the second reflective area 63B are reduced. The variation is detected by the position detecting unit (not shown), images corresponding to the first reflective area 63A and the second reflective area 63B at the detected position are formed, and then the formed images are displayed in the first reflective area 63A and the second reflective area 63B.

On the contrary, the control unit controls the images when the backlight units 10A and 10B are moving from the state where they are unwound from the wound state (shown in FIG. 5) to the state where they completely cover the rotary display member 80A. The control unit turns on only the backlights 101 and 102 corresponding to (located at) the first reflective area 63A and the second reflective area 63B and turns off the other backlights 101 and 102.

According to the above-mentioned embodiment, the following advantages can be obtained, in addition to the advantages of the first embodiment.

(1) The liquid crystal display device 70A or the lighting device 50A according to this embodiment includes two backlight units 10A and 10B. The backlight units 10A and 10B are disposed in the upper portion and the lower portion which are the outer circumference side of the liquid crystal panel 60A, respectively and are made to freely move in the vertical direction. Accordingly, it is possible to further improve the choices in lighting method and to further improve the choices quality of the display screen of the liquid crystal panel 60A.

(2) In the liquid crystal display device 70A or the lighting device 50A according to this embodiment, since the light sources of the backlights 101 and 102 of the backlight units 10A and 10B can be independently driven (turned on and off), it is possible to further improve the choices in lighting method of the backlight units 10A and 10B.

(3) In the game machine 90A as the electronic apparatus employing the liquid crystal display device 70A or the lighting device 50A according to this embodiment, since two backlight units 10A and 10B are disposed in the upper portion and the lower portion which are the outer circumference side of the liquid crystal panel 60A and are made to freely move in the vertical direction, it is possible to further improve the presentation effect in displaying of the game machine 90A.

Third Embodiment

Figure 6:
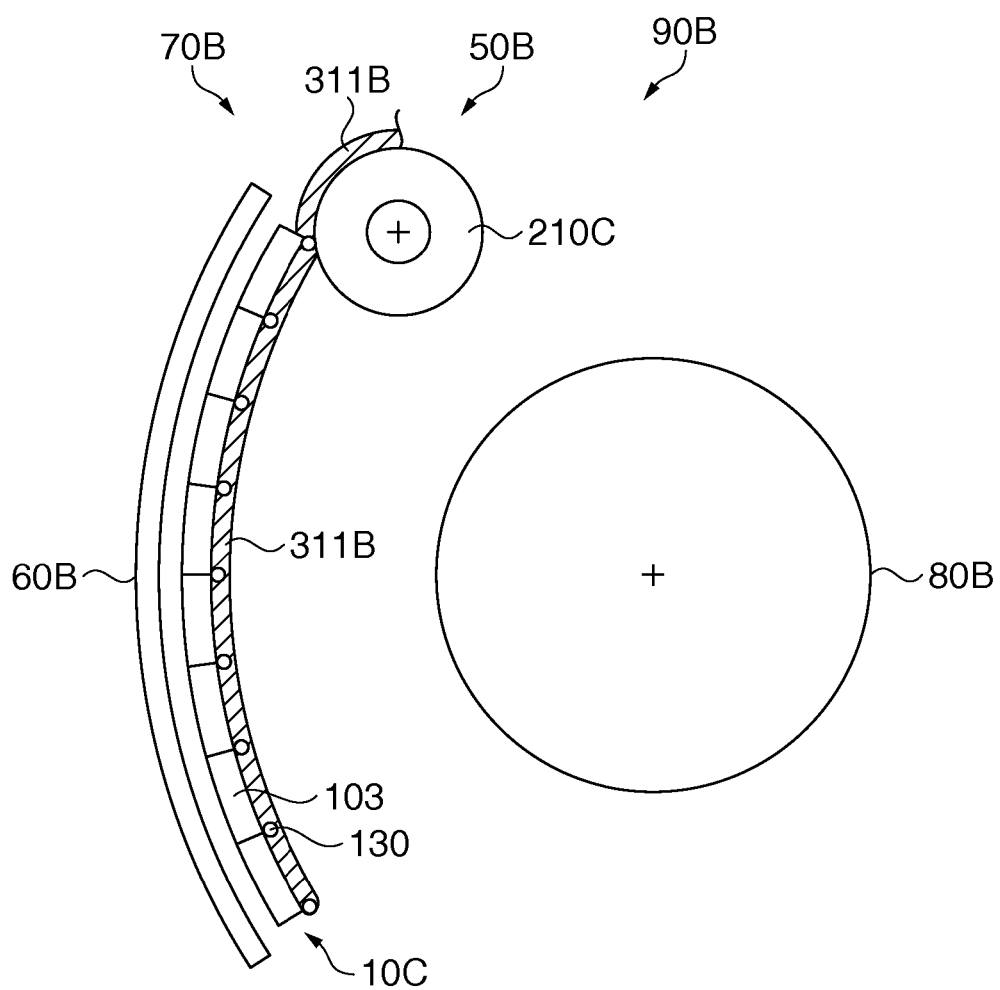
FIG. 6 is a sectional view schematically illustrating a liquid crystal display device according to a third embodiment of the invention.

FIG. 6 is a sectional view schematically illustrating a liquid crystal display device according to a third embodiment of the invention. The configurations of a liquid crystal display device 70B and a lighting device 50B will be described now with reference to FIG. 6.

The lighting device 50B according to this embodiment is to cope with a case where a liquid crystal panel 60B having a curved surface shape is applied to the liquid crystal display device 70B. Specifically, backlights 103 of the lighting device 50B according to this embodiment have a longitudinal rectangular shape of which the surface is curved. The backlights 103 are connected to each other by connection portions 130 to form a backlight unit 10C. Accordingly, the backlight unit 10C has a smooth curved surface shape.

Guide grooves 311B (hatched in the drawing) formed in holding frame not shown are curved to correspond to the backlight unit 10C. The backlight unit 10C can be freely wound and unwound on and from a roller 210C, similarly to the first embodiment. The other configurations are similar to those of the first embodiment. The lighting device 50B having the backlight unit 10C is disposed in the back of the liquid crystal panel 60B to form the liquid crystal display device 70B. The liquid crystal display device 70B is employed in a game machine 90B, where a rotary display member 80B is disposed in the back of the backlight unit 10C.

According to this embodiment, the following advantages can be obtained in addition to the same advantages as the first embodiment.

(1) In the liquid crystal display device 70B or the lighting device 50B according to this embodiment, the backlight unit 10C has a curved surface shape. Accordingly, since the backlight unit 10C can be disposed in a shape substantially corresponding to the shape of the liquid crystal panel 60B having a curved surface shape, it is possible to perform a lighting operation along the shape of the liquid crystal panel 60B, thereby homogeneously lighting the liquid crystal panel 60B having the curved surface shape.

(2) In the liquid crystal display device 70B or the lighting device 50B according to this embodiment, since the choices in displaying or viewing of the game machine 90B is high, it is possible to further enhance the presentation effect in display of the game machine 90B.

Fourth Embodiment

Figure 7A:
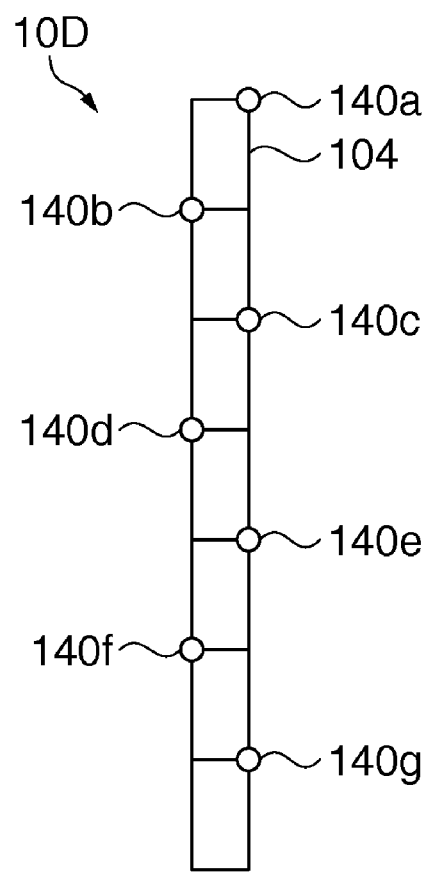
FIGS. 7A and 7B are sectional views schematically illustrating a backlight unit according to a fourth embodiment of the invention.
Figure 7B:
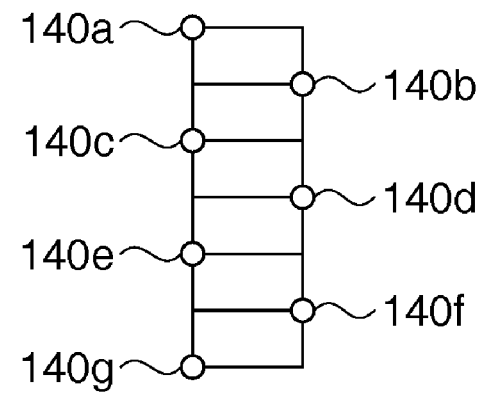

FIGS. 7A and 7B are sectional views schematically illustrating a backlight unit according to a fourth embodiment of the invention, where FIG. 7A is a sectional view schematically illustrating a state where the backlight unit is unfolded and FIG. 7B is a sectional view schematically illustrating a state where the backlight unit is folded. The configuration and operation of the backlight unit 10D will be described now with reference to FIGS. 7A and 7B.

While the backlight unit 10 of the first embodiment is wound, the backlight unit 10D of this embodiment is folded. The backlight unit 10D includes plural backlights 104 having a longitudinal rectangular shape. Connection portions 140 connecting the backlights 104 to each other are different from the connection portions 130 of the first embodiment.

As shown in FIG. 7A, the connection portions 140 are disposed in the diagonal line at the corners of the rear surface side and the front surface side of each backlight 104. By sequentially connecting the backlights 104, the backlights 104 are rotatably supported by the connection portions 140. The other configurations of the backlights 104 are similar to the backlights 100 of the first embodiment.

As shown in FIG. 7B, when the backlight unit 10D is folded, for example, when it is folded at a connection portion 140a, a next connection portion 140b moves up on the right side of the drawing. A next connection portion 140*c* moves up in the drawing with the movement of the connection portion 140*b*. A next connection portion 140*d* moves up on the right side of the drawing with the movements of the connection portion 140*b* and the connection portion 140*c*.

By repeating the movements, as shown in FIG. 7B, the backlight unit 10D is folded and received. The connection portions 140 are connected to a folding portion (not shown) as the driving unit to move as described above. The folding portion includes a link mechanism (not shown) and a motor (not shown) actuating the link mechanism.

By constructing the backlight unit 10D in the same way as the first embodiment, it is possible to construct a lighting device (not shown) and to construct a liquid crystal display device (not shown), which are used in a game machine (not shown).

According to this embodiment, the following advantage can be obtained in addition to the advantages of the first embodiment.

(1) In the backlight unit 10D according to this embodiment, it is possible to allow the backlight unit 10D to efficiently move by the use of the folding portion folding and unfolding the backlight unit.

The invention is not limited to the above-mentioned embodiments, but may be modified and improved in various forms. Modified examples are described below.

MODIFIED EXAMPLE 1

The backlight unit 10 according to the first embodiment includes the backlights 100 and the connection portions 130 connecting the backlights 100 to each other and is used as the lighting device 50 of the liquid crystal panel 60 as the lighting object. However, the backlight unit is not limited to the applications, but may be used as a lighting device for a lighting object other than the liquid crystal panel 60.

MODIFIED EXAMPLE 2

The backlight unit 10 according to the first embodiment includes the driving unit 20 and is thus allowed to freely move relative to the liquid crystal panel 60, but may be allowed to freely move relative to a lighting object other than the liquid crystal panel 60.

MODIFIED EXAMPLE 3

In the backlight unit 10 according to the first embodiment, the light sources 120 are turned on in the state where the backlight unit 10 is wound by the roller 210 to light the rotary display members 80. However, the embodiment is not limited to the configuration, but the wound backlights 100 may be turned off and a lamp for lighting the rotary display members 80 may be provided additionally.

MODIFIED EXAMPLE 4

The backlight unit 10 according to the first embodiment is wound in the upper portion of the liquid crystal panel 60, but is not limited to the configuration. The backlight unit 10 may be wound in an outer circumferential direction of the liquid crystal panel 60.

MODIFIED EXAMPLE 5

In the installation structure of the light guide plates 110 of the backlights 100 according to the first embodiment, the prism sheet 112 is disposed in the back of the light guide plate body 111 and the reflecting plate 113 is disposed in the back of the prism sheet 112. However, the light guide plate is not limited to this structure, but may have a structure in which the prism sheet 112 is disposed in the front of the light guide body 111 and the reflecting plate 113 is disposed in the back of the light guide plate body 111.

MODIFIED EXAMPLE 6

Two backlight units 10A and 10B according to the second embodiment are disposed in the upper portion and the lower portion of the liquid crystal panel 60A, respectively, but are not limited to this configuration. The backlight units may be disposed on the outer circumference side of the liquid crystal panel 60A. For example, the backlight units may be disposed on the right and left side of the liquid crystal panel 60A.

MODIFIED EXAMPLE 7

The number of backlight units 10A and 10B according to the second embodiment is two, but is not limited to two. The number of backlight units greater than two may be disposed on the outer circumference side of the liquid crystal panel 60A.

MODIFIED EXAMPLE 8

The backlight unit 10C according to the third embodiment is used as the lighting device 50B for the curved liquid crystal panel 60B as the lighting object. However, the backlight unit is not limited to the application, but may be applied as a lighting device for a curved lighting object other than the liquid crystal panel 60B.

MODIFIED EXAMPLE 9

The backlight unit 10C according to the third embodiment includes the roller 210C as the winding portion to freely move relative to the curved liquid crystal panel 60B. However, the backlight unit is not limited to the configuration, but may be made to freely move relative to a curved lighting object other than the liquid crystal panel 60B.

MODIFIED EXAMPLE 10

The number of backlight unit 10C used in the third embodiment is one, but two more backlight units may be constructed to freely move relative to the liquid crystal panel 60B from the outer circumference sides thereof.

MODIFIED EXAMPLE 11

The surface of the respective backlights 103 in the third embodiment has a curved surface shape. However, the surface of each backlight is not limited to the curved surface shape, but may have a non-curved shape. For example, the surface of each backlight may have a flat surface shape. It is enough as long as the backlight unit has a curved surface shape by guidance of the guide grooves 311B.

MODIFIED EXAMPLE 12

In the first and second embodiments, when the transmissive areas 62 and 62A are formed, no image is displayed in the transmissive areas 62 and 62A, but an image may be displayed in the transmissive areas. In this case, since the images on the liquid crystal panels 60 and 60A can be viewed in addition to the rotary display members 80 and 80A or the patterns on the rotary display members 80 and 80A, it is possible to further enhance the presentation effect.

MODIFIED EXAMPLE 13

In the first and second embodiments, when the backlight units 10, 10A, and 10B are wound, the reflective area 63, the first reflective area 63A, and the second reflective area 63B are formed, but the invention is not limited to the configuration. The reflective areas may not be formed, but the entire area of the image viewing areas 61 and 61A may be used as the transmissive area to transmit the image of the rotary display members 80 and 80A.

MODIFIED EXAMPLE 14

In the first and second embodiments, when the backlight units 10, 10A, and 10B are wound, the reflective area 63, the first reflective area 63A, and the second reflective area 63B are formed. However, the positions of the reflective areas are not fixed, but may be properly determined by positions where the backlight units 10, 10A, and 10B moving in the back of the liquid crystal panels 60 and 60A are stopped. The transmissive areas 62 and 62A may be properly determined at positions where the backlight units 10, 10A, and 10B are stopped.

MODIFIED EXAMPLE 15

In the first and second embodiments, the backlight units 10, 10A, and 10B include eight backlights 100 and five backlights 101 and 102, but the number of backlights 100, 101, and 102 is not limited to the numerical values. The optimal number of backlights can be properly determined depending on the size of a lighting object or the experiment result of reflection.

MODIFIED EXAMPLE 16

The backlight units 10A and 10B according to the second embodiment include five backlights 101 and 102, but the number of backlights is not limited to five. The number of backlights may be greater than five. In this case, by turning on the backlights to light the rotary display members 80A in the wound state, the lighting lamp 81 in the rotary display members 80A is not necessary.

MODIFIED EXAMPLE 17

The light sources 120 of the backlights 100 in the first embodiment employ an LED element to emit a white beam. However, the invention is not limited to the configuration, but the LED element may emit a red beam, a green beam, or a blue beam. Another color beam may be emitted using a filter and the like. Accordingly, it is possible to enhance the degree of freedom in lighting method of the backlights 100.

MODIFIED EXAMPLE 18

The backlight unit 10 according to the first embodiment emits the white beam. However, the invention is not limited to the white beam, but may employ a backlight unit including backlights 100 emitting different color beams. For example, the backlight 100a may emit a red beam, the backlight 100b may emit a green beam, and the backlight 100c may emit a blue beam. By employing the LED element as the light source 120, it is possible to properly determine the color beam for each backlight 100.

MODIFIED EXAMPLE 19

The backlights 100 of the first embodiment each have one light source 120 on each end surface as a side surface of the light guide plate 110, but the number of light sources 120 is not limited. For example, only one light source 120 may be disposed on one end surface. Alternatively, for example, plural light sources 120 may be disposed on one end surface. The side surface is not limited to the end surface. For example, the light source may be disposed on the upper or lower side surface of the backlights 100. The optimal position and number of light sources 120 may be determined depending on the experiment result of light guiding property of the backlights 100.

MODIFIED EXAMPLE 20

The above-mentioned embodiments are applied to the game machines 90, 90A, and 90B as the electronic apparatus, but are not limited to the applications. The invention may be applied to an electronic apparatus intending to light a liquid crystal panel with a movable backlight unit or an electronic apparatus intending to visualize an object disposed in the back of a liquid crystal display device, in addition to the game machines 90, 90A, and 90B.

The exemplary embodiments of the invention are described above, but the invention is not limited to the embodiments. That is, the invention is shown and described with reference to the specific embodiments, but it should be understood by those skilled in the art that the embodiments can be modified (changed and improved) in various forms such as shape, material, and number of specific elements, without departing from the technical spirit and scope of the invention. Accordingly, embodiments obtained by allowing those skilled in the art to variously modify the shape, material, and number of the specific elements should be included in the invention.

What is claimed is:

1. A lighting device comprising:
   a lighting object;
   a plurality of backlights each having a light guide plate disposed in the back of the lighting object to guide light and emit the light to the lighting object and a light source disposed on a side surface of the light guide plate to emit the light to the light guide plate, the plurality of backlights connected to each other forming a backlight unit that emits light to the lighting object;
   a rotary display member disposed on a side of the backlight unit that is opposite a side of the backlight unit where the lighting object is disposed; and
   a driving unit including a roller to which an end of the backlight unit is attached, wherein upon rotation of the roller in a first direction, the driving unit is operable to wind the backlight unit around the roller to emit light to the rotary display member and the lighting object, and upon rotation of the roller in a second direction, the driving unit is operable to entirely unwind the backlight unit from around the roller to emit light to the lighting object.

2. The lighting device according to claim 1, wherein the driving unit allows the backlight unit to freely move relative to the lighting object.

3. The lighting device according to claim 1, wherein the backlight unit is disposed to have a curve surface shape.

4. The lighting device according to claim 1, wherein the light sources are driven independently of each other.

5. The lighting device according to claim 1, wherein the light sources are turned on in a state where the backlight unit is wound.

6. The lighting device according to claim 1, wherein an LED element is used as the light source.

7. A liquid crystal display device comprising:
   the lighting device according to claim 1; and
   a transmissive liquid crystal panel disposed as the lighting object in the front of the lighting device.

8. The liquid crystal display device according to claim 7, wherein the number of the backlight units is at least two, and
   wherein the backlight units freely move relative to the liquid crystal panel from the outer circumference side.

9. An electronic apparatus comprising:
   the liquid crystal display device according to claim 7; and
   an object disposed in the back of the liquid crystal display device,
   wherein the object is viewed from the front side of the liquid crystal display device through the liquid crystal display device.

10. An apparatus comprising:
    a liquid crystal device;
    at least one backlight unit disposed proximate the liquid crystal device, the backlight unit including a plurality of enlongate backlights each hingedly coupled to each other;
    at least one roller to which the at least one backlight unit is coupled, upon rotation of the at least one roller, the backlight unit being wound and unwound from a surface of the roller; and
    a rotary display member disposed on a side of the backlight unit that is opposite to a side of the backlight where the liquid crystal device is disposed.

11. The apparatus of claim 10, further comprising a second backlight unit disposed proximate the liquid crystal device, and including another plurality of elongate backlights each hingedly coupled to each other; and
    a second roller to which the second backlight unit is coupled, wherein upon rotation of the second roller, the second backlight unit is wound and unwound from a surface of the second roller.

* * * * *